US008629806B2

(12) United States Patent
Banh

(10) Patent No.: US 8,629,806 B2
(45) Date of Patent: *Jan. 14, 2014

(54) DIFFERENTIALLY COHERENT STROBE CORRELATOR

(71) Applicant: CSR Technology Inc., Sunnyvale, CA (US)

(72) Inventor: Nam Dieu Banh, Aliso Viejo, CA (US)

(73) Assignee: CSR Technology Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,255

(22) Filed: Jan. 4, 2013

(65) Prior Publication Data

US 2013/0120189 A1    May 16, 2013

Related U.S. Application Data

(63) Continuation of application No. 13/009,277, filed on Jan. 19, 2011, now Pat. No. 8,368,592.

(51) Int. Cl.
    *G01S 19/22* (2010.01)
    *G01S 19/30* (2010.01)
    *G01S 19/37* (2010.01)

(52) U.S. Cl.
    USPC ............ 342/357.61; 342/357.69; 342/357.77

(58) Field of Classification Search
    USPC ............ 342/357.61, 357.63, 357.68, 357.69, 342/357.75–357.77
    See application file for complete search history.

(56) References Cited

U.S. PATENT DOCUMENTS 6,272,189 B1 *   8/2001   Garin et al. .................. 375/343

OTHER PUBLICATIONS

"The Mitigation of Multipath Errors by Strobe Correlators in GPS/GLONASS Receivers" Veitsel, Victor A. et al. GPS Solutions, vol. 2, No. 2, pp. 38-45 (1998).*
Gerard Lachapelle et al., "GNSS Solutions: Atomic Clocks on Satellites and Mitigating Multipath", Inside GNSS, Sep. 2006, pp. 22-27.

* cited by examiner

*Primary Examiner* — Cassie Galt
(74) *Attorney, Agent, or Firm* — RatnerPrestia

(57) ABSTRACT

A GPS receiver for tracking a GPS signal. The receiver generates a mixed GPS signal by mixing the GPS signal with an oscillator signal, generates a first correlation signal by correlating the mixed GPS signal with a reference signal, and generates a filtered GPS signal from the GPS signal. The receiver also generates a filtered reference signal from the reference signal, generates a second correlation signal by correlating the filtered GPS signal with the filtered reference signal, and a generates a combined correlation signal by combining the first correlation signal with the second correlation signal. The receiver tracks the GPS signal by adjusting the phase of the oscillator signal based on the combined correlation signal.

18 Claims, 13 Drawing Sheets

DIFFERENTIALLY COHERENT STROBE CORRELATOR

CROSS REFERENCE TO RELATED APPLICATIONS

This application is a continuation of U.S. application Ser. No. 13/009,277, filed Jan. 19, 2011, entitled DIFFERENTIALLY COHERENT STROBE CORRELATOR, the contents of which are incorporated herein.

The present invention relates, in general, to a system for tracking a GPS signal in a multi-path environment. More specifically, the present invention relates to a differentially coherent correlator which combines a conventional correlation with a strobe correlation to produce tracking information used to track the GPS signal.

BACKGROUND

In conventional GPS receivers, a spread spectrum correlator correlates the received GPS signal with a reference signal. In multi-path environments, however, a line of sight (LOS) GPS signal is combined with delayed multi-path GPS signals which make it difficult to track the LOS signal. Conventional spread spectrum correlators are able to track the LOS GPS signal when the delays of the multi-path signals are greater than one code chip of the GPS coarse/acquisition (CA) code.

In certain multi-path environments (e.g. urban canyon environments), however, multi-path GPS signals may have delays of less than one code chip. In these multi-path environments, the conventional correlation peaks of the LOS and multi-path GPS signals smear together and are not distinguishable. Thus, the conventional correlator has difficulty resolving and tracking the LOS GPS signal.

SUMMARY

The present invention is embodied in a system for tracking a GPS signal (e.g. the LOS GPS signal) in multi-path environments where the multi-path delays may be less than one code chip. The system may include a GPS receiver for receiving the GPS signals. The system may also include a processor running software, or dedicated circuitry, for combining a conventional correlation with a strobe correlation to produce tracking information for adjusting the phase of a local oscillator used for mixing. It is understood that the foregoing general description and the following detailed description are exemplary, but not restrictive, of the invention.

DETAILED DESCRIPTION

As will be described, the example embodiments provide a GPS receiver for tracking a GPS signal. The GPS receiver may include a differentially coherent correlator for combining at least two correlations to determine a phase offset of a local oscillator signal with respect to the line of sight (LOS) GPS signal.

In general, a GPS signal (e.g. an LOS signal combined with delayed multi-path MP signals) is received and mixed with a local oscillator signal to demodulate the GPS signal. A conventional correlation and a strobe correlation are then computed based on the demodulated GPS signal and a locally generated reference signal.

For example, a reference signal such as a coarse/acquisition CA code (i.e. a GPS sequence of 1023 bits (i.e. chips) that are repeatedly transmitted by a satellite every 1 ms) received in the GPS signal may be correlated with a reference copy of the CA code generated locally by the GPS receiver. These two correlations are then combined (e.g. a dot product is computed) to produce a differentially coherent correlation. The delay of the differentially coherent correlation is then processed by a discriminator and associated with a phase offset of the local oscillator signal with respect to the received LOS GPS signal. A code phase loop may then adjust the phase of the local oscillator signal based on the correlation delay so that the receiver is able to resolve and track the LOS GPS signal.

Figure 1:
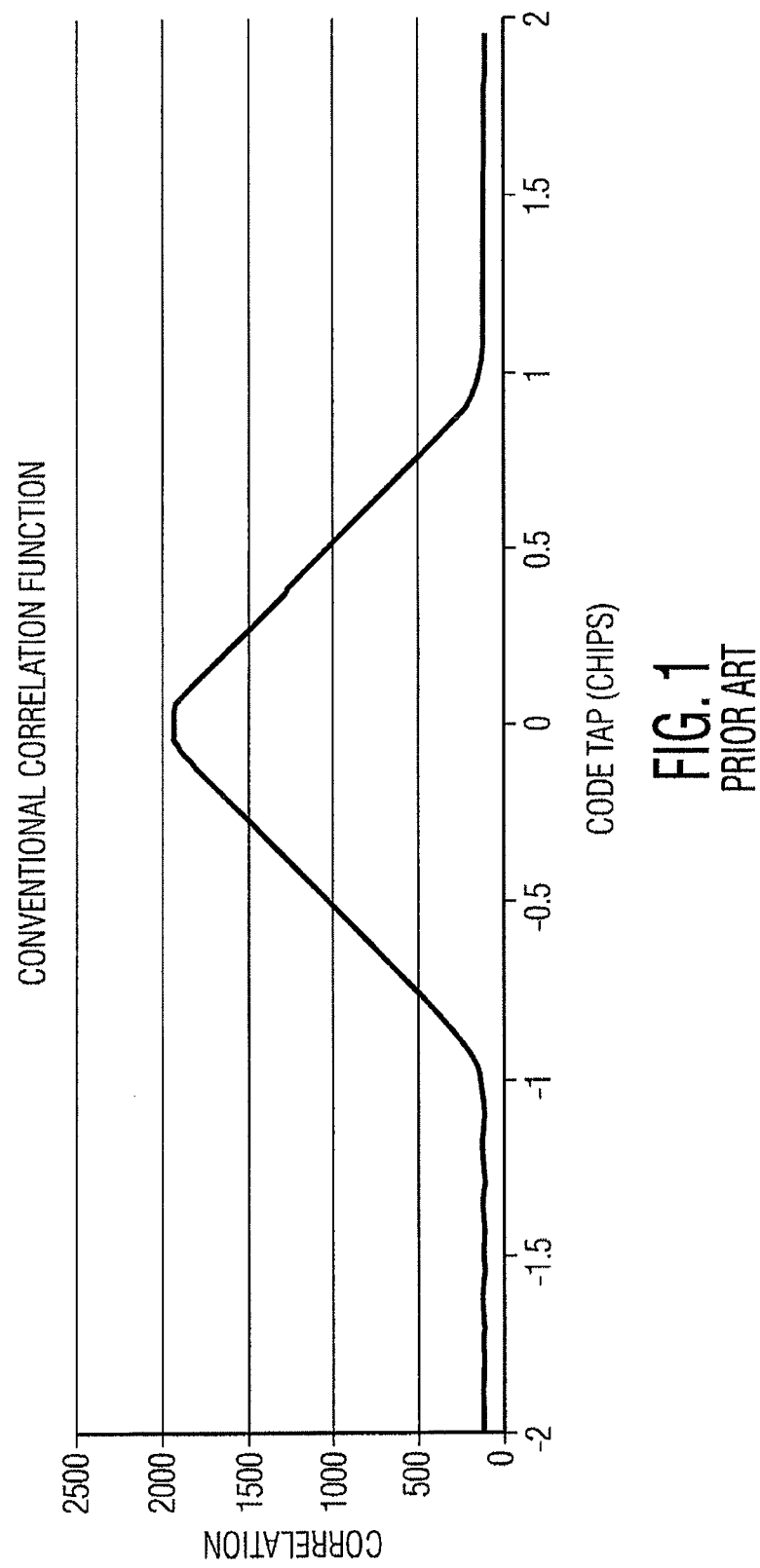
FIG. 1 is a plot of a conventional correlation function, according to an embodiment of the present invention.

Shown in FIG. 1 is a conventional correlation function for a conventional spread spectrum correlator. In general, the conventional correlation function may resolve the LOS signal from the multi-path signals as long as the multi-path signals have delays that are greater one CA code chip. This is shown in FIG. 1 where the conventional correlation function is located between −1 and 1 CA code chips.

Figure 2:
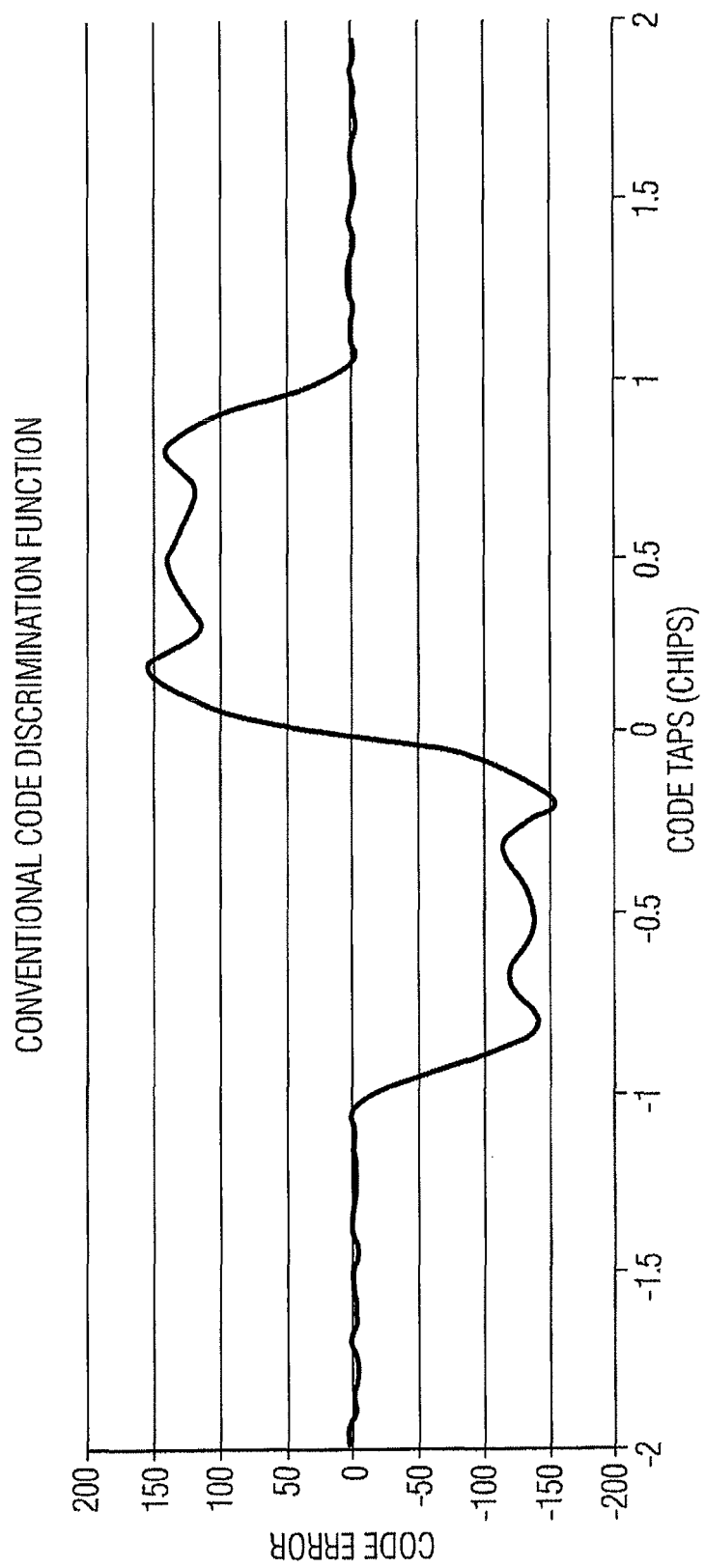
FIG. 2 is a plot of a conventional discrimination function, according to an embodiment of the present invention.

As a result of the conventional correlation function of FIG. 1, the conventional code discrimination function as shown in FIG. 2 may have large error values between −1 and 1 chips. Thus, the conventional correlator may only be able to discriminate the LOS signal outside of the ranges of −1 and 1 chips, where the error is minimal. In general, since the conventional correlation function spans two chips, the wide discrimination function will not be able to resolve the LOS correlation peak when the multi-path correlation peaks are less than 1 chip.

Figure 10:
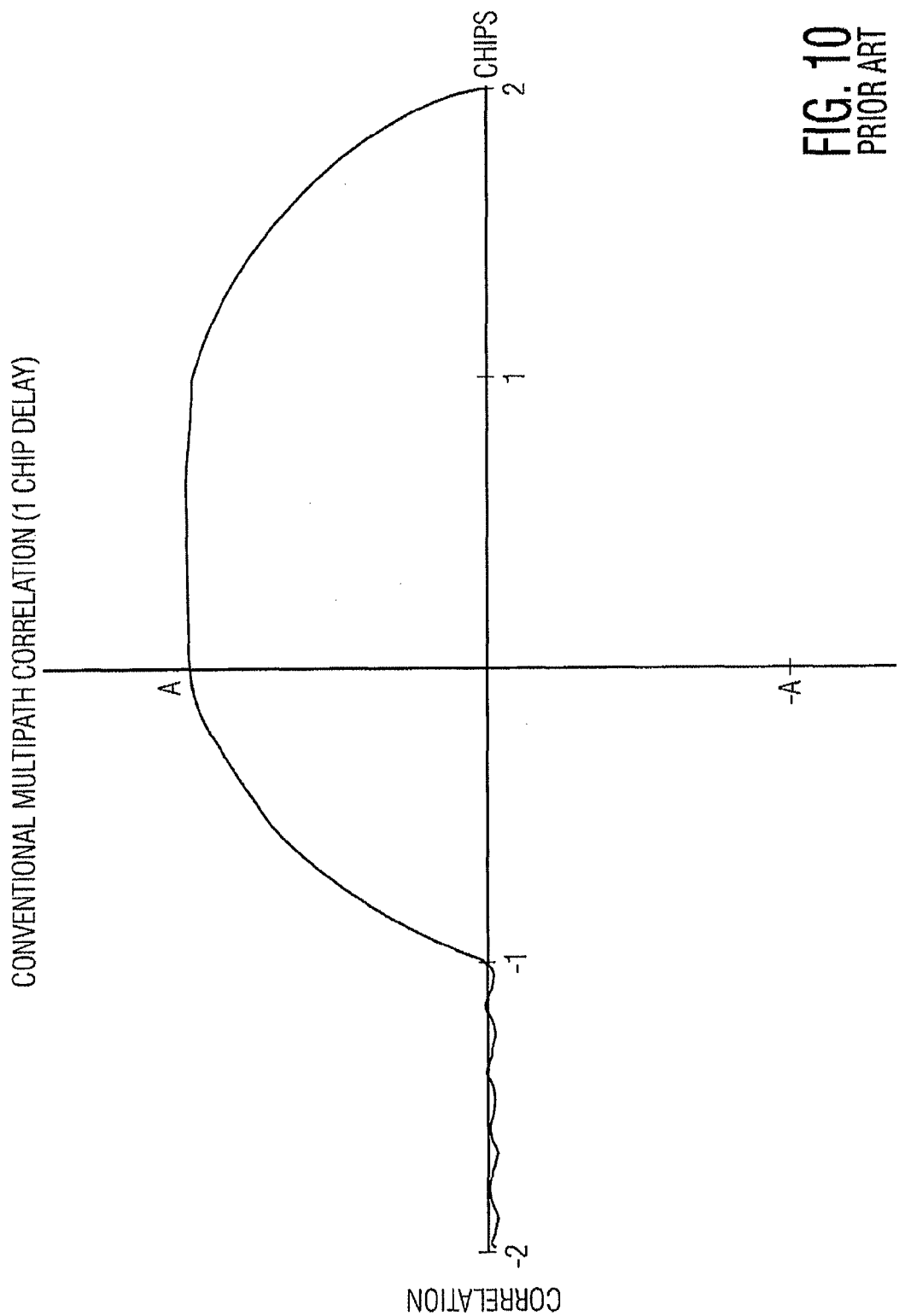
FIG. 10 is a plot of a conventional multi-path (1 chip delay) correlation function, according to an embodiment of the present invention.
Figure 11:
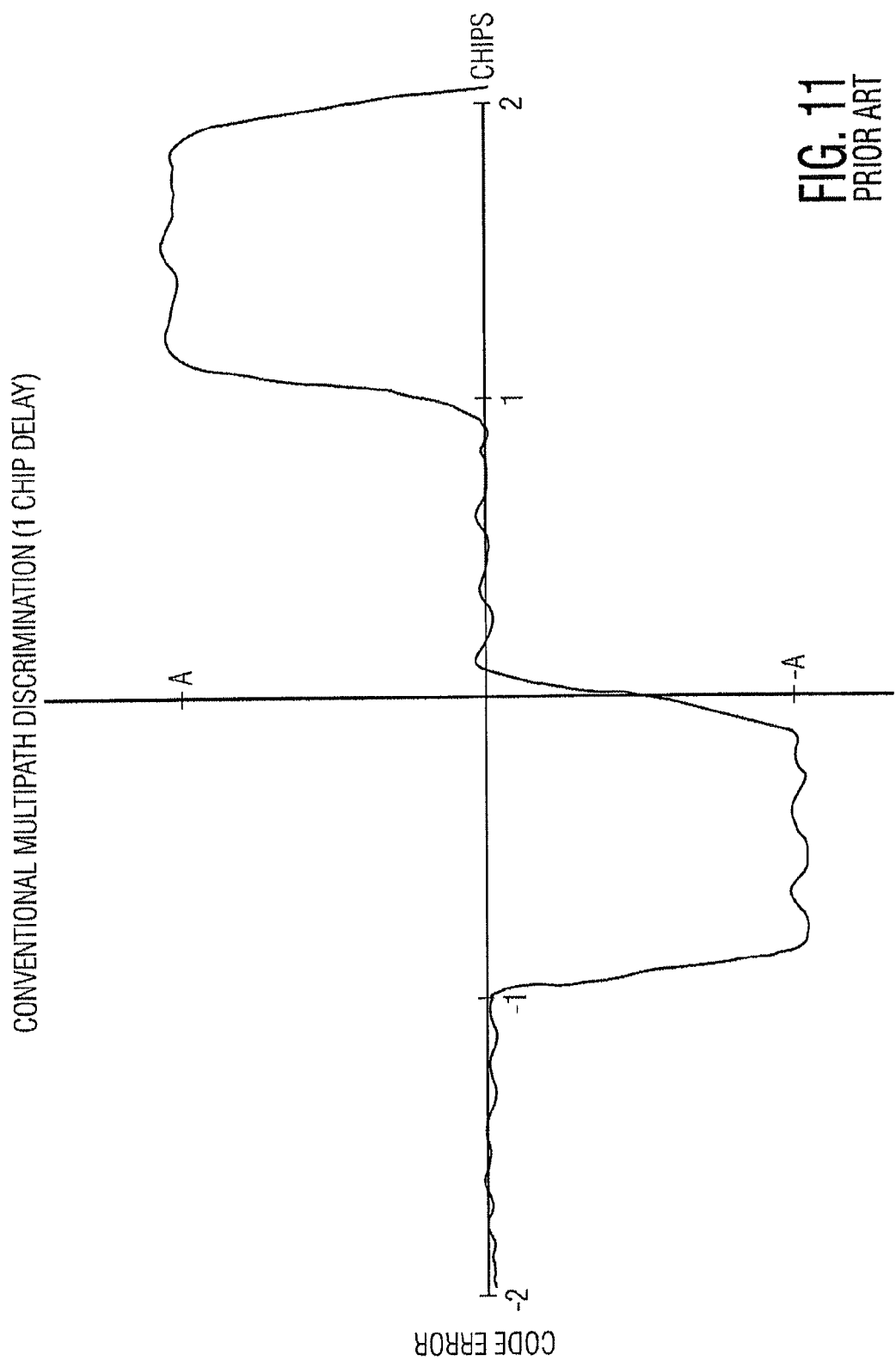
FIG. 11 is a plot of a conventional multi-path (1 chip delay) discrimination function, according to an embodiment of the present invention.

For example, as shown in FIG. 10 (where the LOS signal and the MP signal are one chip apart), the conventional correlation may smear the correlation peak of the LOS GPS signal with the correlation peak of a MP GPS signal (i.e. the correlation peaks combine and are not distinguishable). This may result in a biased discrimination function shown in FIG. 11 where a dead zone occurs between zero and one chips (i.e. the discrimination function is no longer symmetric about zero chips, and therefore the LOS cannot be properly tracked).

Taking the difference between the GPS signal and a delayed version of the GPS signal before correlation may narrow the base of the correlation function as well as a narrow the base of the discrimination function. This type of correlation is known as a strobe correlation function which is shown in FIG. 3.

In general, the main correlation peak at 0 chips has a narrow base between −0.25 and 0.25 chips. The strobe correlation function, however, suffers from side lobe peaks centered at −1 and 1 chips. Even though the strobe correlation peak is narrower, the unwanted side lobes (e.g. of a multi-path GPS signal) may still interfere with the correlation peak of an LOS GPS signal thereby resulting in a smeared correlation similar to the conventional correlation shown in FIG. 10. The side lobes may also be incorrectly interpreted as a weak LOS signal.

Figure 3:
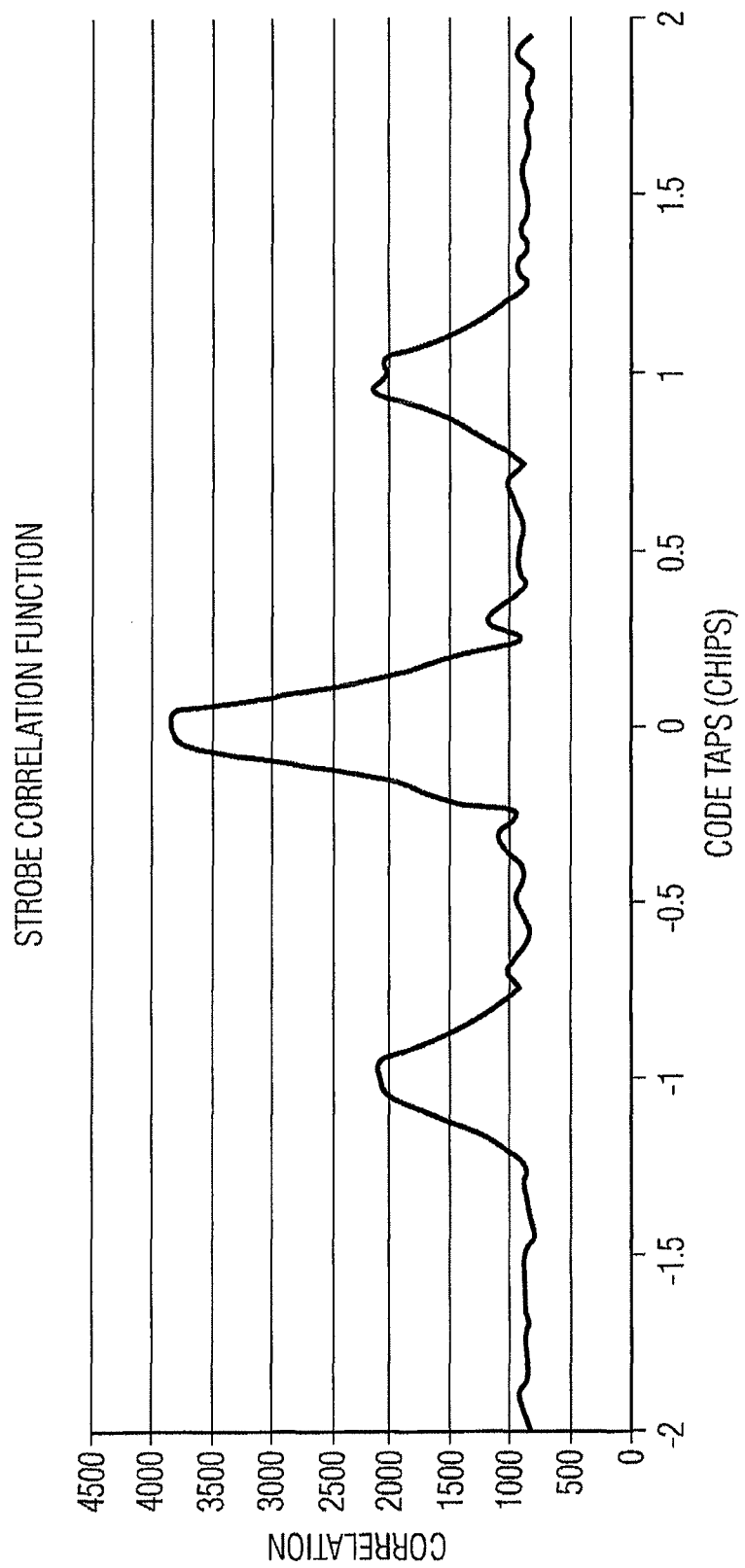
FIG. 3 is a plot of a conventional strobe correlation function, according to an embodiment of the present invention.
Figure 4:
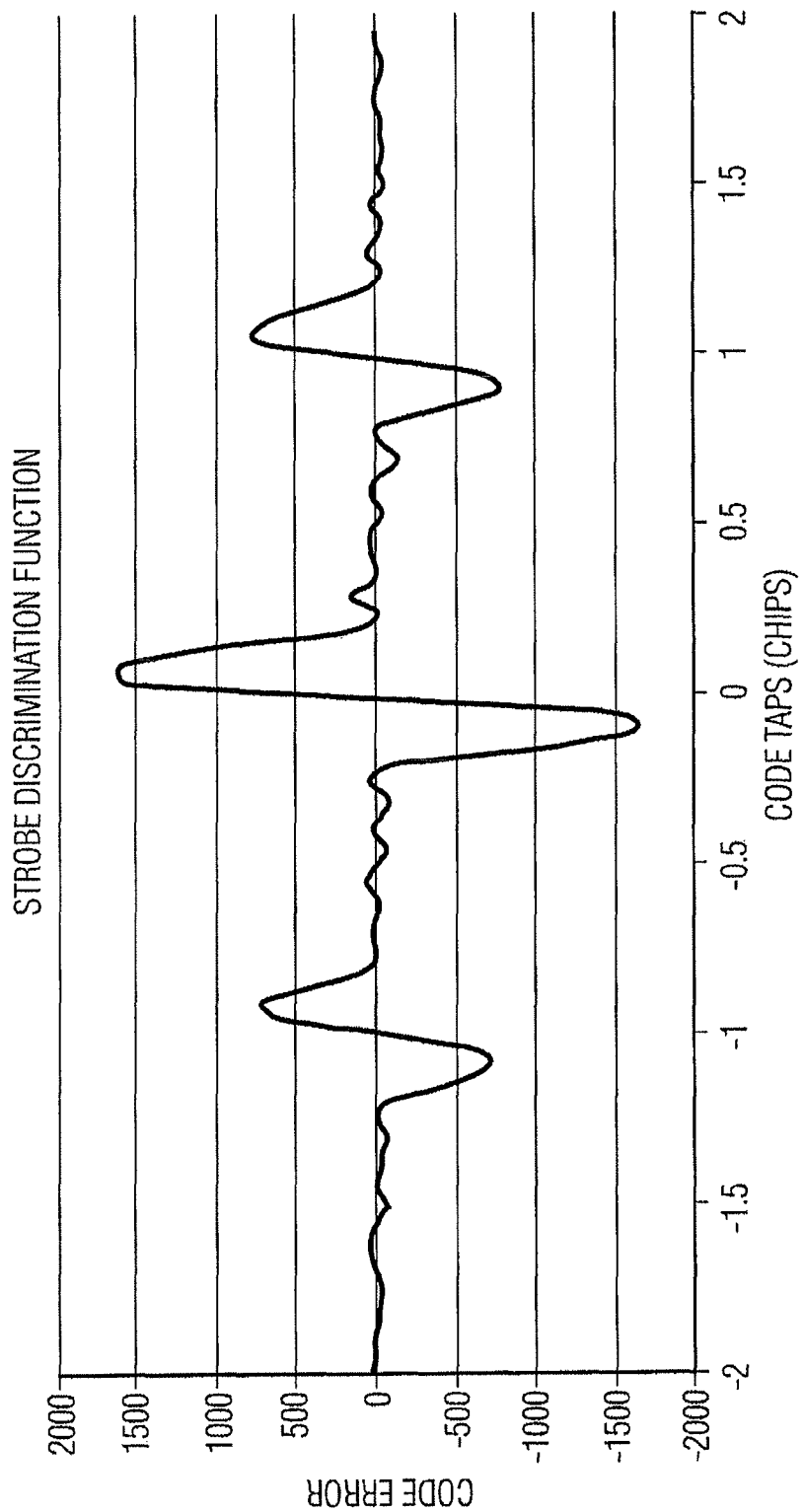
FIG. 4 is a plot of a conventional strobe discrimination function, according to an embodiment of the present invention.
Figure 5:
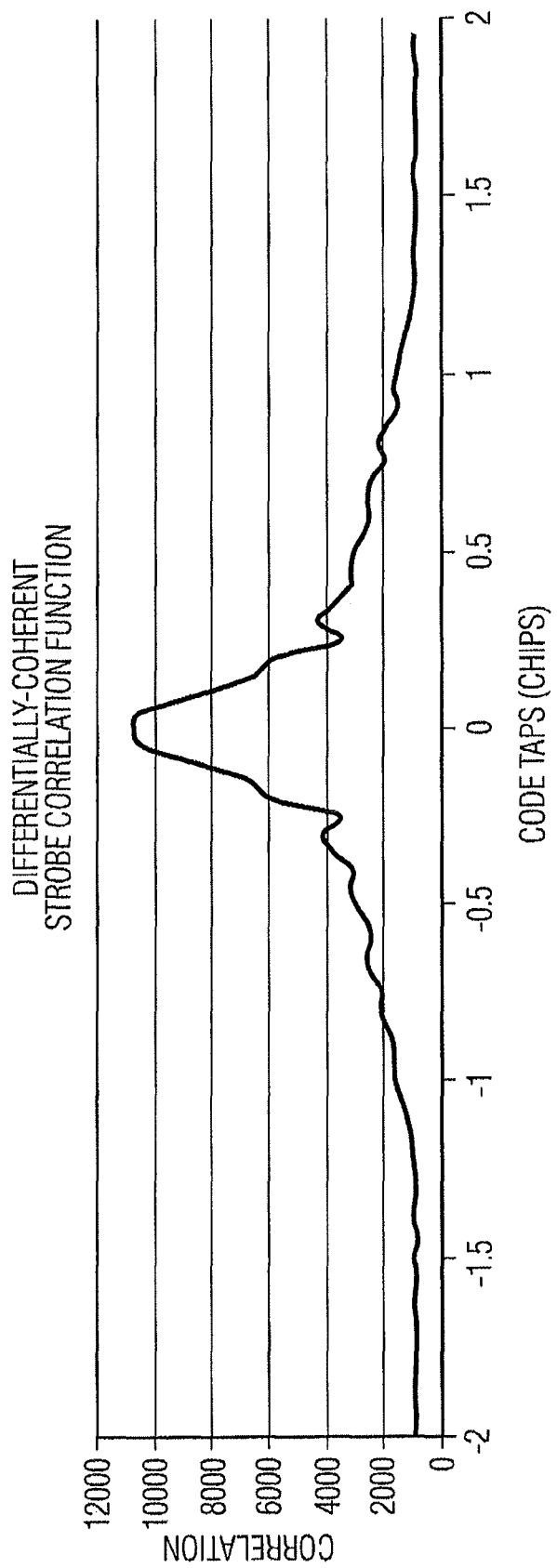
FIG. 5 is a plot of a differentially coherent strobe correlation function, according to an embodiment of the present invention.

In one embodiment of the present invention, the conventional correlation function of FIG. 1 and the strobe correlation function in FIG. 3 are combined to produce a differentially coherent strobe correlation function as shown in FIG. 5. The differentially coherent strobe correlation function in FIG. 5 takes advantage of the narrow base of the main strobe correlation peak in FIG. 3 while eliminating the unwanted strobe side lobes. The result is a narrow correlation function between −0.25 and 0.25 chips that does not include significant side lobes. Thus, the differentially coherent strobe determination function as shown in FIG. 6 is able to resolve the LOS GPS signal from the multi-path signals when the delay is greater than or equal to 0.25 chips.

Figure 6:
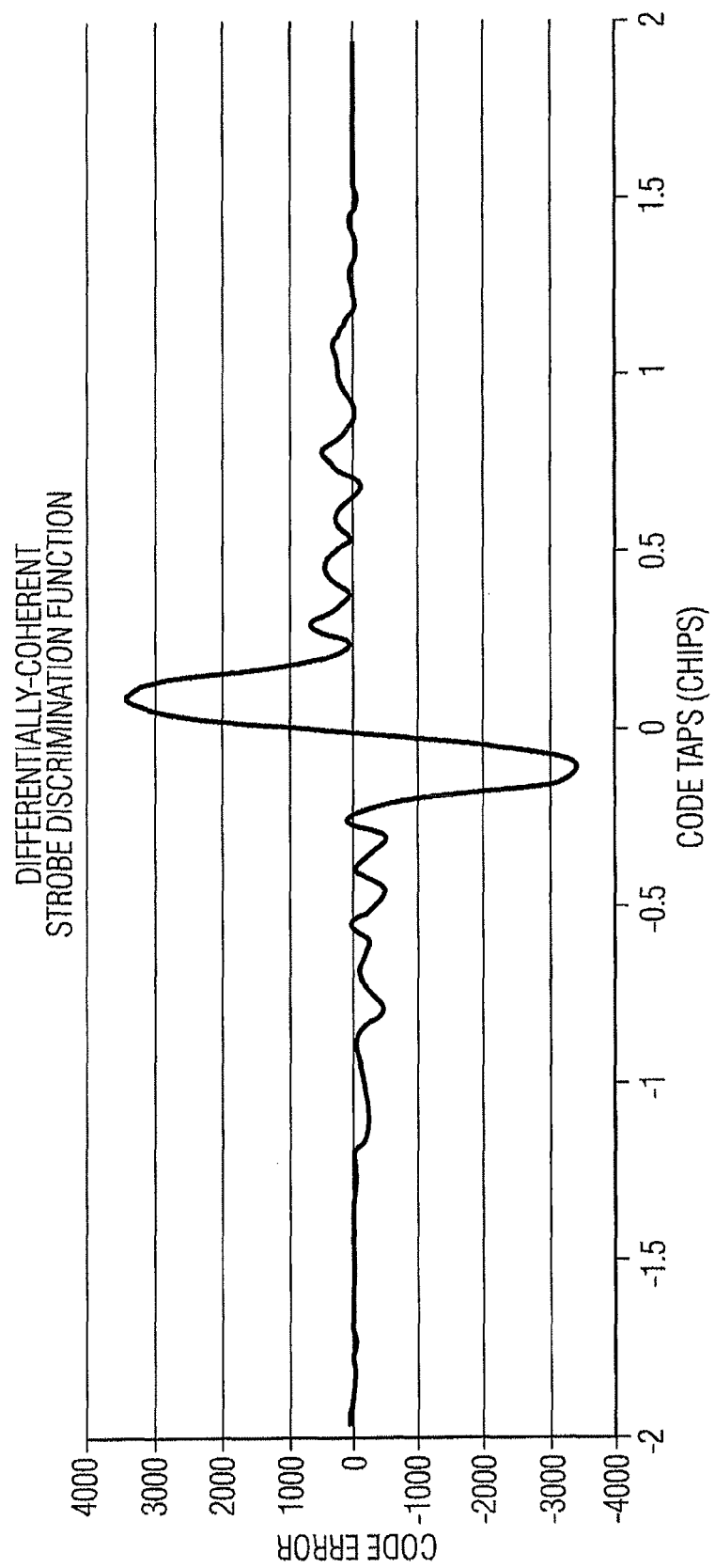
FIG. 6 is a plot of a differentially coherent strobe discrimination function, according to an embodiment of the present invention.
Figure 7:
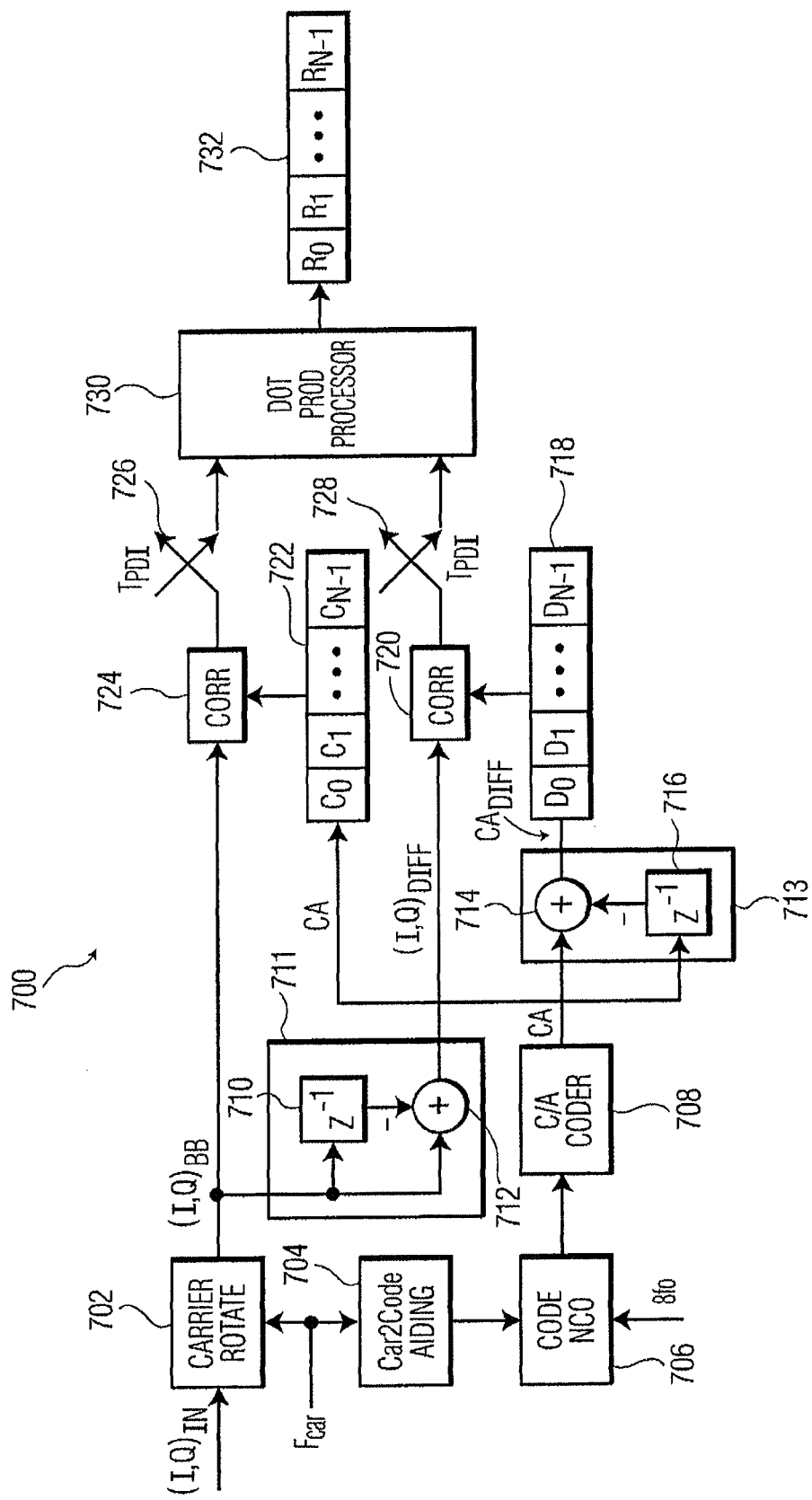
FIG. 7 is a differentially coherent correlator circuit, according to an embodiment of the present invention.

FIG. 7 shows an example embodiment of a differentially coherent correlator circuit for producing the differentially coherent strobe correlation function and discrimination functions shown in FIGS. 5 and 6 respectively. The received GPS signal $(I,Q)_{IN}$ is sampled (e.g. at 8f0, where f0=1.023 MHz) and mixed (i.e. demodulated) with a local oscillator signal Fcar at 702. The base band signal $(I,Q)_{BB}$ output by 702 is then input to correlator 720 and 724.

The differentially coherent correlator circuit also includes CA coder 708 which generates a CA code in response to input signals from the carrier to code aiding module 704 and code numerically controlled oscillator (NCO) module 706. A number of delayed versions of the CA code are then input to registers 722 and correlator 724. For example, CA code C0 may not be delayed, whereas CA code C1 may be delayed by one sample time, C2 may be delayed by two sample times, and CN may be delayed by N−1 sample times. In general, N correlations between the one undelayed and N−1 delayed versions of the CA code and the base band GPS signal $(I,Q)_{BB}$ are computed over a predetermined amount of time (e.g. 20 ms integration time).

For example, 20 ms of the base band GPS signal $(I,Q)_{BB}$ may be correlated with 16 different 20 ms versions of the CA code (i.e. a 20 ms version of the CA code delayed by 0, 1, 2, ... 15 sample times respectively). The 16 different correlations result in a vector of 16 correlation values.

Similarly, a strobe correlation is performed between the base band GPS signal and the generated CA code. The base band GPS signal, however is first filtered (e.g. a difference is computed between the CA code and a delayed version of the CA code). Specifically, subtractor 712 and delay 710 (i.e. filter circuit 711) produce a difference signal $(I,Q)_{DIFF}$ which is inputted to correlator 720. Similarly, the CA code is also filtered by filter 713 which includes subtractor 714 and delay block 716 to produce $CA_{DIFF}$. One undelayed and N−1 (e.g. 15) delayed versions of $CA_{DIFF}$ are then stored in registers 718 and input to correlator 720.

It is noted that although filters 711 and 713 are implemented as a single zero filter having a delay of one sample, that other filter configurations are possible. For example, the filter may delay both the base band GPS signal and the generated CA code by 2, 3, 4, etc, samples instead of 1 sample. The filters may also include multiple delay blocks and multiple adders/subtractors to realize various transfer functions (i.e. zero and pole placement).

Similar to conventional correlator 724, strobe correlator in 720 may produce 16 different correlations between $(I,Q)_{DIFF}$ and the 16 delayed versions of $CA_{DIFF}$ (i.e. 20 ms of $(I,Q)_{DIFF}$ may be correlated with 20 ms of $CA_{DIFF}$ delayed by 0, 1, 2, 3 ... 15 sample times). After the predetermined amount of time (e.g. 20 ms of integration), switches 726 and 728 are closed so that the correlation vectors (each including 16 correlation values) are input to dot product processor 730. In general, dot product processor 730 performs dot product between the correlation vector used by the conventional correlator and the correlation vector produced by the strobe correlator (i.e. corresponding correlation values in the vectors are respectively multiplied to produce the differentially coherent correlation vector 732 containing 16 differentially coherent correlation values).

In general, the number of correlations N may be any integer number. It is also noted that the integration time (i.e. the length of the base band signal and CA code used during integration may also be any amount of time (e.g. 20 ms).

For example, if the sample rate is set at 8f0 where f0 is 1.023 MHz, each chip in the CA code produces 8 samples. If each integration is performed over 20 ms, then each correlation tap correlates a GPS base band signal and a corresponding CA code resulting in correlations having respective lengths of (8 samples/chip)*(1023 chips/CA)*(20 ms)=163,680 samples. In general, the correlations are aligned with data transitions in the CA code so that the correlated data is coherent.

For tracking purposes, the position of peak values (peak of the correlation) within differentially coherent correlation vector 732 may be analyzed to determine the phase offset of local oscillator signal Fcar. In general, the LOS GPS signal may be tracked by maintaining the first peak value in the middle of vector 732.

Figure 12:
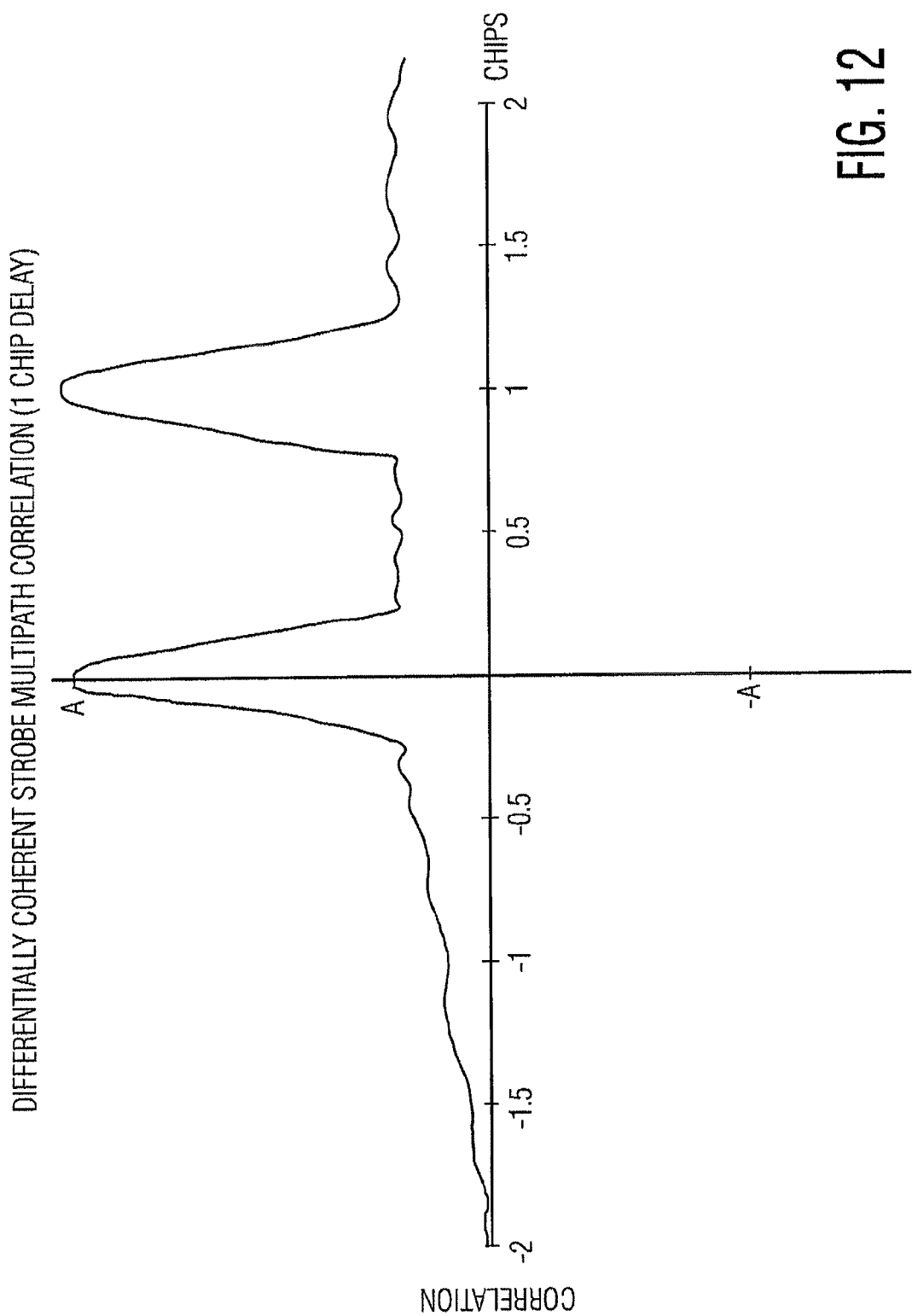
FIG. 12 is a plot of a differentially coherent strobe multi-path (1 chip delay) correlation function, according to an embodiment of the present invention.
Figure 13:
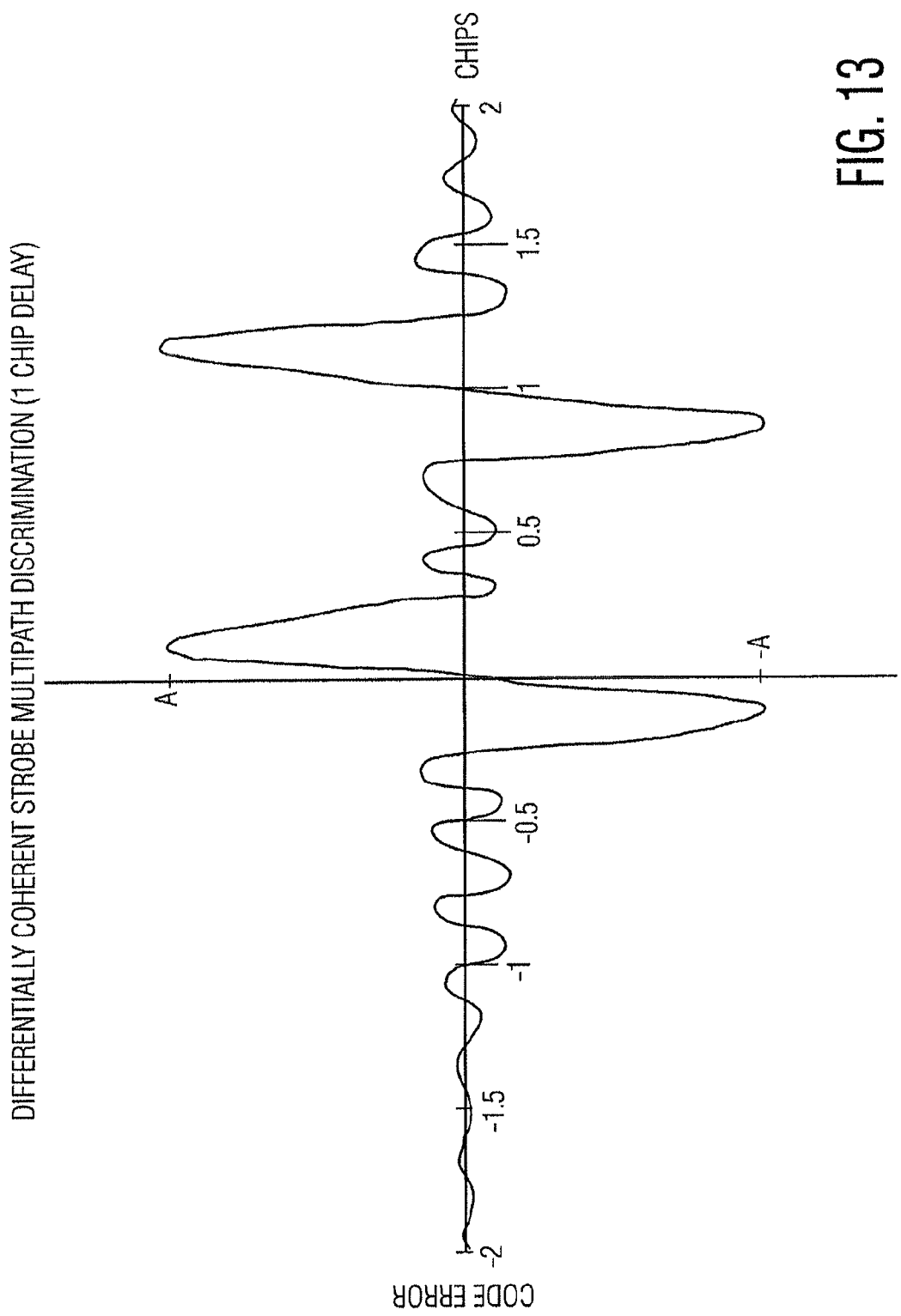
FIG. 13 is a plot of a differentially coherent strobe multi-path (1 chip delay) discrimination function, according to an embodiment of the present invention.

For example, as shown in FIG. 12, in a multi-path environment, a LOS correlation peak may occur at a 0 chip delay, and a MP correlation peak may occur at a 1 chip delay. Unlike in the conventional correlation (where the correlation peaks are smeared), the differentially coherent correlation results in two distinct peaks (i.e. LOS and MP peak). This also results in a differentially coherent discrimination which is relatively unbiased (i.e. the LOS discrimination function is centered at 0 chips and is not skewed significantly as the conventional discrimination function shown in FIG. 11).

If the LOS correlation peak value (i.e. the first peak value centered at 0 chips in FIG. 12) of vector 732 is in positions R8 and R9 (e.g. R8-R9 is approximately 0) for a vector length 16, then the LOS GPS signal may be properly tracked. If the LOS peak value in vector 732, however, is skewed to a lower or higher R position (e.g. R1, R2, R13, R14), then it may be determined that the phase of Fcar used for mixing the GPS signal and generating the CA code may need adjustment (e.g.

the carrier phase may need a positive or negative phase adjustment in order to properly track the LOS signal).

The phase of Fcar is adjusted (e.g. by Carrier Rotate 702 and Car2Code Aiding 704) until the LOS peak value of the differentially coherent correlation vector 732 is moved to the middle of the vector (i.e. the phase of the locally generated carrier is adjusted until the peak correlation value is in the middle of differentially coherent correlation vector 732 so that the correlation is symmetric about R8 and R9 where R8-R9≈0).

In general, the adjustment may be performed continuously, periodically, or based on system requirements/performance. In one example, the system may include a decision circuit to control the timing and frequency of the adjustment.

If the system is implemented in an urban canyon environment (i.e. where the LOS signal is interfered with by multipath signals having a delay of less than 1 chip), the differentially coherent correlator in FIG. 6 is able to track the LOS signal by adjusting the position of a peak value of the dot product corresponding to the LOS correlation value.

It is noted that although FIG. 7 shows that the system computes a dot product between the conventional and strobe correlations, that other combining operations may be implemented (e.g. the correlations may be combined by other functions to suppress the strobe side-lobes).

Figure 8:
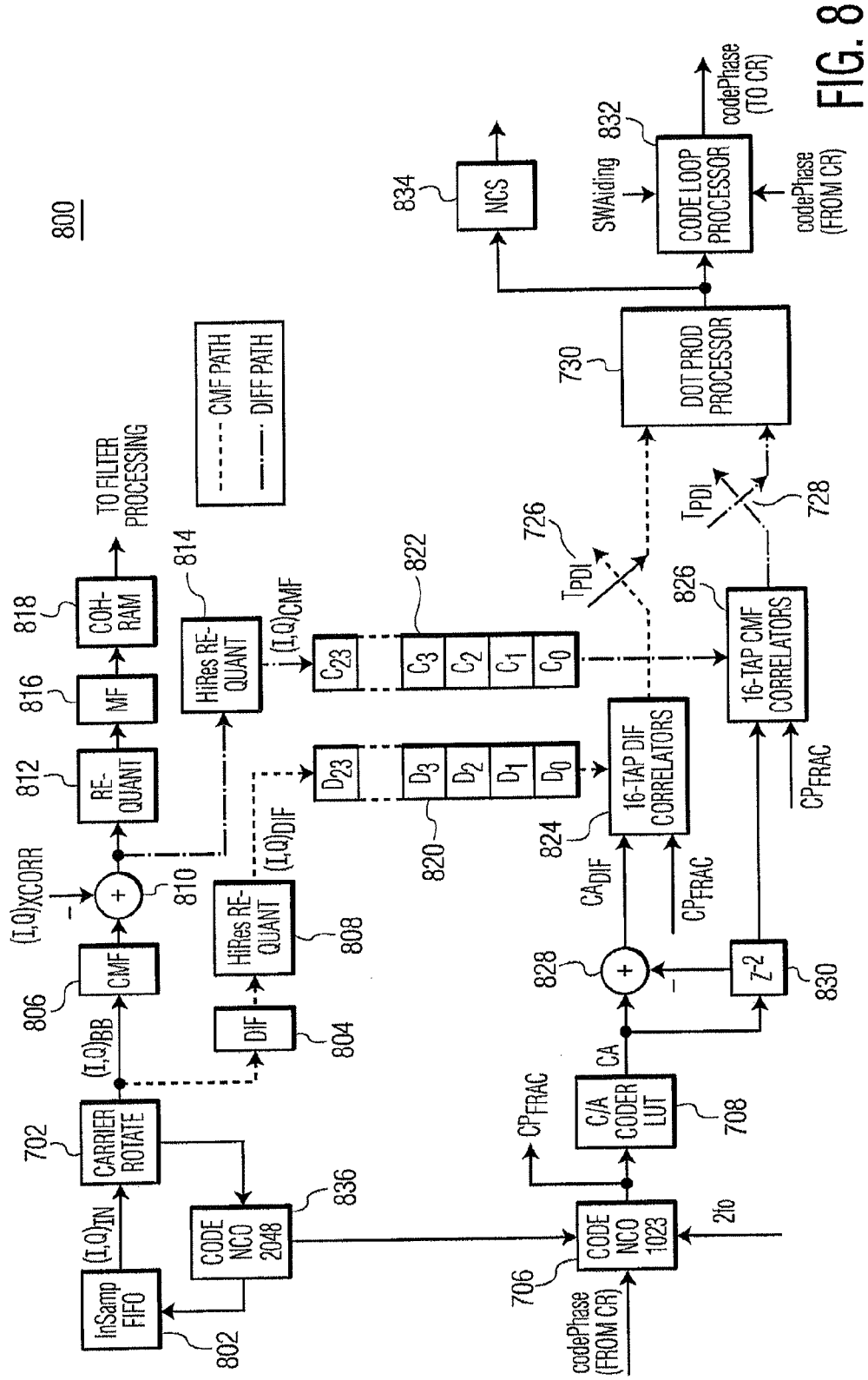
FIG. 8 is another differentially coherent correlator circuit, according to an embodiment of the present invention.

Shown in FIG. 8 is another embodiment of the differentially coherent correlator shown in FIG. 7. The correlator in FIG. 8 is a more detailed embodiment (i.e. a specific hardware implementation of the correlator).

Differentially coherent correlator 800 as shown in FIG. 8 includes similar components to that of FIG. 7 (e.g. carrier rotate 702, code NCO 706, CA Coder 708, switches 726 and 728 and dot product processor 730). Circuit 800, however, also includes additional hardware such as code NCO 836, subtractor 828, double delay 830, chip matched filter CMF 806, differential circuit diff 804, high resolution quantizer 808 and 814, adder 810, re-quantizer 812, matched filter MF 816, coherent RAM 818, registers 820 and 822, correlators 824 and 826, NCS 834 and code loop 832.

In general, input GPS signal $(I,Q)_{IN}$ is sampled (e.g. at 4×) at 802 and mixed with a carrier at 702 to produce base band GPS signal $(I,Q)_{BB}$. The Base band signal is then matched filtered at CMF 806 which runs an 8 sample moving sum to correlate each chip so that correlators 824 and 826 may operate at a lower frequency f0 for each correlation. A calculated cross correlation component of the GPS signal $(I,Q)_{XCORR}$ is then subtracted from the CMF output. The output of 810 is then quantized at 812, matched filtered at 816, and buffered in RAM 818 before its output to a filter processing section.

The output of adder 810 is also input to quantizer 814 and then stored in registers 822. Similarly, the differential base band signal, $(I,Q)_{BB}$, produced by filter circuit 804 is then quantized in 808 and stored in registers 820. Thus, the differential base band $(I,Q)_{DIFF}$ and the matched filtered base band signals, $(I,Q)_{CMF}$, are correlated with a delayed and a filtered version of CA code 708 via correlators 824 and 826.

After the integration time (e.g. after 20 ms), switches 726 and 728 close so that the dot product of the correlators may be computed by processor 730. The dot product is then input to NCS 834 and code loop processor 832.

In general, code loop processor 832 utilizes the dot product to determine the code phase for adjusting carrier rotation 702. Specifically, the dot product, the code phase from carrier rotate 702 and an aiding signal are input to code loop processor 832. Based on these signals, code loop processor 832 is able to compute the phase shift that is used to adjust the phase and frequency of the carrier signal to track the LOS GPS signal.

Figure 9:
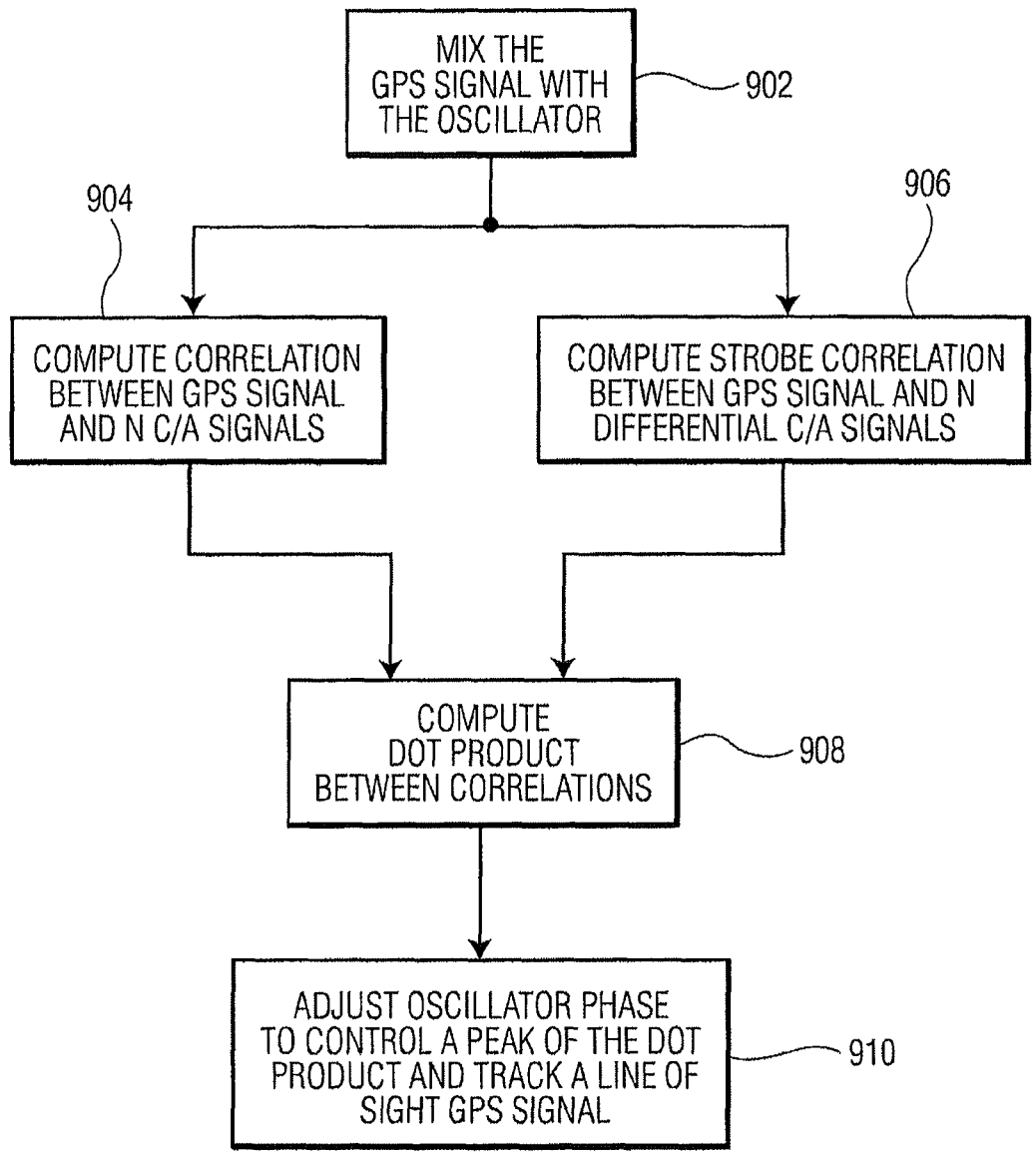
FIG. 9 is a flow chart describing the operation of the differentially coherent correlator circuits in FIGS. 7 and 8, according to an embodiment of the present invention.

The operation of the differentially coherent correlator is described in the flow chart of FIG. 9. The GPS signal is mixed using a local oscillator signal (step 902). The mixed base band GPS signal is then utilized to compute a conventional correlation and a strobe correlation in steps 904 and 906 respectively. Specifically, in step 904, the conventional correlation is computed between the base band GPS signal and one undelayed and N−1 delayed CA signals. In step 906, the strobe correlation is computed between the base band GPS signal and one undelayed and N−1 delayed CA signals (i.e. the difference between the CA signal and a delayed version of the CA signal). The conventional correlation of step 904 and strobe correlation in 906 are then combined, for example, by computing the dot product between the correlations in step 908. The combined correlations (e.g. dot product) is then utilized to adjust the phase of the oscillator for mixing the GPS signal and generating the CA code (i.e. tracking the GPS signal). Specifically, the phase of the oscillator is adjusted (by the code loop processor) so that a position of the LOS peak (i.e. first peak) of the dot product is in the middle of a differentially coherent correlation register. By maintaining the first peak of the dot product in the middle of the register, the LOS GPS signal may be tracked.

It is noted that the differentially coherent correlator as shown in FIGS. 7 and 8 may be implemented in hardware where the various modules (e.g. correlators 724, 720 and dot product 730) may be dedicated hardware circuits. Also, the various modules may be implemented in software executed by a processor.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of generating a combined correlation signal, the method comprising:
   mixing, by a GPS receiver, a GPS signal with an oscillator signal to generate a mixed GPS signal;
   correlating, by the GPS receiver, the mixed GPS signal with a reference signal to generate a first correlation signal;
   generating, by the GPS receiver, a differentiated GPS signal from the mixed GPS signal;
   generating, by the GPS receiver, a differentiated reference signal from the reference signal;
   correlating, by the GPS receiver, the differentiated GPS signal with the differentiated reference signal to generate a strobe correlation signal; and
   combining, by the GPS receiver, the first correlation signal with the strobe correlation signal to generate a combined correlation signal.

2. The method of claim 1, wherein
   to produce the first correlation signal, a T millisecond interval of the mixed GPS signal is respectively correlated with a T millisecond interval of one undelayed and N−1 delayed copies of the reference signal, and
   to produce the strobe correlation signal, a T millisecond interval of the differentiated GPS signal is respectively correlated with a T millisecond interval of one undelayed and N−1 delayed copies of the differentiated reference signal, where T>0 and N>0.

3. The method of claim 1, wherein
the mixed GPS signal is differentiated before generating the strobe correlation by computing a difference between the mixed GPS signal and the mixed GPS signal delayed by M sample times, and
the reference signal is differentiated before generating the strobe correlation by computing a difference between the reference signal and the reference signal delayed by M sample times, where M>0.

4. The method of claim 1, wherein
the combined correlation signal is generated by computing a dot product between the first correlation signal and the strobe correlation signal.

5. The method of claim 4, wherein
the dot product includes a vector of N values.

6. The method of 1, wherein
the combined correlation signal is generated by narrowing a width of the first correlation signal using the strobe correlation signal, and reducing side lobes of the strobe correlation signal using the first correlation signal.

7. The method of claim 1, wherein
the phase of the oscillator signal is adjusted by phase rotation prior to mixing, and
the phase of the oscillator signal is adjusted to synchronize a phase of the reference signal with a phase of the GPS signal.

8. The method of claim 1, wherein
the GPS signal is a line of sight coarse/acquisition (CA) GPS signal transmitted from a satellite and interfered with by a plurality of multi-path CA GPS signals which are copies of the line of sight CA GPS signal.

9. The method of claim 1, wherein
adjusting the phase of the oscillator is performed by the GPS receiver continuously, periodically, or based on receiver performance.

10. A GPS receiver for generating a combined correlation signal, including:
a mixer configured to mix a GPS signal with an oscillator signal to generate a mixed GPS signal;
a first correlator configured to correlate the mixed GPS signal with a reference signal to generate a first correlation signal;
a first differentiator circuit configured to generate a differentiated GPS signal from the mixed GPS signal;
a second differentiator circuit configured to generate a differentiated reference signal from the reference signal;
a second correlator configured to correlate the differentiated GPS signal with the differentiated reference signal to generate a strobe correlation signal; and
a processor configured to combine the first correlation signal with the strobe correlation signal to generate a combined correlation signal.

11. The system of claim 10, including
wherein the first correlator includes N correlation taps for correlating T milliseconds of the mixed GPS signal respectively with T milliseconds of one delayed and N−1 delayed copies of the reference signal, and
wherein the second correlator includes N correlation taps for correlating T milliseconds of the differentiated mixed GPS signal with T milliseconds of one undelayed and N delayed copies of the differentiated reference signal, where T>0 and N>0.

12. The system of claim 11, wherein
the first differentiator circuit includes a first delay circuit coupled to a first subtractor for subtracting a delayed copy of the mixed GPS signal from the mixed GPS signal to generate the differentiated mixed GPS signal, and
the second differentiator circuit includes a second delay circuit coupled to a second subtractor for subtracting a delayed copy of the reference signal from the reference signal to generate the differentiated reference signal,
wherein the mixed GPS signal and the reference signal are both differentiated by the first and second differentiator circuits respectively before being correlated by the second correlator.

13. The system of claim 10, wherein
the combining processor includes a dot product processor which computes a dot product between the first correlation signal and the strobe correlation signal to generate the combined correlation signal.

14. The system of claim 13, wherein
the dot product processor includes N registers for buffering N dot product values.

15. The system of claim 10, wherein
the mixer includes a carrier rotation circuit which rotates the phase of the oscillator signal prior to mixing, and
a carrier aiding circuit adjusts the phase of the oscillator signal to synchronize a phase of the reference signal with a phase of the GPS signal.

16. The system of claim 10, wherein
the GPS receiver includes an antenna for receiving the GPS signal as a line of sight coarse/acquisition (CA) GPS signal transmitted from a GPS satellite and interfered with by a plurality of multi-path CA GPS signals which are copies of the line of sight CA GPS signal.

17. The system of claim 10, including:
a chip matched filter computing a chip wide moving sum on the mixed GPS signal prior to correlation.

18. The system of claim 17, including:
an adder for adding a correlation of the mixed GPS signal with the moving sum prior to processing the GPS signal to determine location of the receiver.

* * * * *

UNITED STATES PATENT AND TRADEMARK OFFICE
CERTIFICATE OF CORRECTION

| | |
|---|---|
| PATENT NO. | : 8,629,806 B2 |
| APPLICATION NO. | : 13/734255 |
| DATED | : January 14, 2014 |
| INVENTOR(S) | : Banh |

It is certified that error appears in the above-identified patent and that said Letters Patent is hereby corrected as shown below:

On the Title Page, in Item (57), under "ABSTRACT", in Column 2, Line 9, delete "and a" and insert -- and --, therefor.

In the Claims

In Column 7, Line 16, in Claim 6, delete "of 1," and insert -- of claim 1, --, therefor.

Signed and Sealed this
Twenty-second Day of April, 2014

Michelle K. Lee
*Deputy Director of the United States Patent and Trademark Office*